April 22, 1969     T. J. BAYARD     3,439,926

SIMULATED MOTOR DEVICE FOR ATTACHING TO A VEHICLE

Filed Aug. 8, 1967

INVENTOR.
THOMAS J. BAYARD
BY *Hofgren, Wegner, Allen,
Stellman & McCord.*

ATTORNEYS.

United States Patent Office 3,439,926
Patented Apr. 22, 1969

3,439,926
SIMULATED MOTOR DEVICE FOR ATTACHING
TO A VEHICLE
Thomas J. Bayard, 1105 Seward, Evanston, Ill. 60202
Filed Aug. 8, 1967, Ser. No. 659,225
Int. Cl. B62k 23/02, 9/00; A63b 71/00
U.S. Cl. 280—1.11                                    10 Claims

ABSTRACT OF THE DISCLOSURE

A bicycle attachment device of uncomplicated construction for simulating appearance, action and/or noise of a motor including a momentum wheel which can have a ratchet portion and is mounted for rotation and movement toward and away from the bicycle tire with a concave tire engaging tread and which can have a simulated motor cover thereover. The ratchet engages a removable feeler to give motor sound during operation. The wheel can be moved to engage the tire by a sheath push-pull control cable via a gripper mounted at the bicycle handle with a tension spring return for disengaging the wheel.

BACKGROUND OF THE INVENTION (1) *Field of the invention*

This invention relates to a device for wheeled vehicles utilizing an energy-storing momentum wheel for aiding in propelling the vehicle and giving some sensation of motor drive.

(2) *Brief description of the prior art*

It has heretofore been proposed to provide fly wheels or momentum wheels mounted on bicycles, or the like, for assisting in propelling upwards and thereby simulating the feel of a motor drive. One such device is disclosed by L. M. Wallace in U.S. Patent 1,329,940. The Wallace device involves the use of a large wheel mounted on the rear of the bicycle frame and a drive for driving the rear wheel from a sprocket on the bicycle rear wheel. The drive includes a belt tightener or releaser for engaging the momentum wheel and the sprocket. The device requires extensive revision of the bicycle design and cannot readily be attached to all bicycles of current design. Further, this device involves the very complicated drive train between the momentum wheel and sprocket, and the device is very expensive.

SUMMARY OF THE INVENTION

The present invention provides a simple device which is capable of attachment to bicycles or other wheel vehicles of almost any design. The device includes a momentum wheel which is mounted for rotation on the vehicle frame by a system including a flexible or movable portion so that the wheel can be moved between a position engaging the vehicle tire and the position retracted from the vehicle tire. A selectively operable system is also provided in combination with the momentum wheel and mounting means for moving the wheel between the engaging and retracted positions.

While this invention is susceptible of embodiment in many different forms, there is shown in the drawings and will herein be described in detail a specific embodiment of the invention with the understanding that the present disclosure is to be considered an exemplification of the principles of the invention and is not limited to the embodiment illustrated.

DESCRIPTION OF THE PREFERRED EMBODIMENTS

Figure 1:
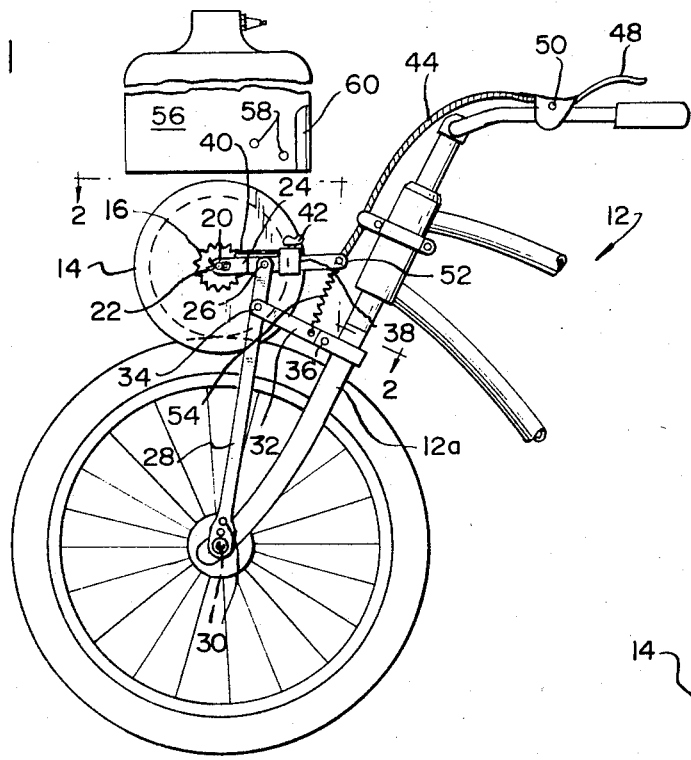
FIGURE 1 is a side plane view of an embodiment of the invention showing the cover exploded from the remainder of the device.
Figure 2:
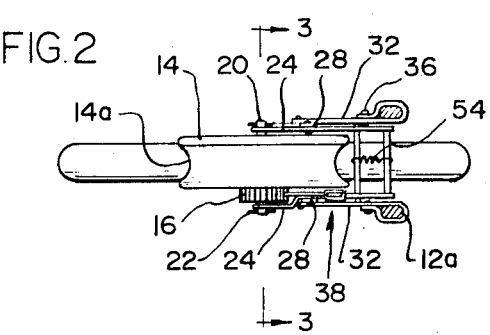
FIGURE 2 is a view from along line 2—2 of FIGURE 1.
Figure 3:
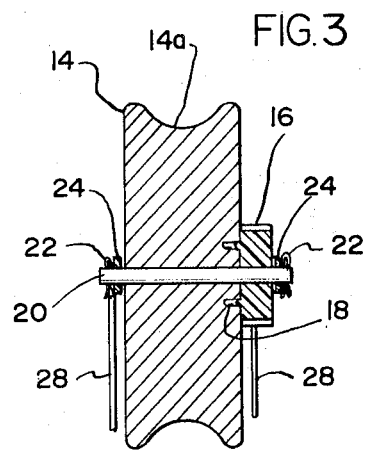
FIGURE 3 is a section through the momentum wheel along line 3—3 of FIGURE 2.

Turning now to the drawings, there is shown a form of the bicycle present invention. In the figure, a bicycle is identified at 12. The device includes a momentum wheel 14 (FIGURES 1, 2 and 3) which is a heavy cast-iron wheel having a concave tread at 14a which may be advantageously herringboned for better gripping of the tire. A ratchet wheel 16, formed of plastic or the like, is secured for rotation with momentum wheel 14 by means of mounting studs 18 (FIGURE 3) which are integral with ratchet wheel 16 (FIGURES 1, 2 and 3). The combination of momentum wheel 14 and ratchet wheel 16 is mounted for rotation on an axle or pin 20 which projects through bores in a pivot arm 24 and is secured against undue axial movement by cotter pins 22.

Pivot arms 24 are mounted for pivotal movement on pivot pins 26 (FIGURE 1) to support legs 28 which have a series of lower bores 30 for securing these support legs to the bicycle wheel axial in much the same manner as the conventional bicycle basket. Support legs are secured. The plurality of lower bores 30 permits adaptability of the device to bicycles of various wheel sizes. A support arm 32 (FIGURES 1 and 2) is secured to the support leg 28 by a suitable bolt as at 34 and extends to and around a leg of the bicycle front wheel fork and is secured thereto by suitable bolts at 36. Support arms 32 (FIGURES 1 and 2) are properly shaped for clearance of momentum wheel 14 so that the momentum wheel is free for rotation.

Figure 4:
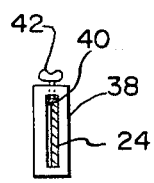
FIGURE 4 is a vertical section through the feeler mounting means of the device in FIGURE 1.

A clamp block 38 (FIGURES 1, 2 and 4) is secured to one of pivot arms 24 on the same side of wheel 14 as sprocket wheel 16. Clamp block 24 has a slot for receiving a stiff plastic or metal feeler 40 with the end of the feeler in engagement with sprocket wheel 16. A clamp screw 42 is removably threaded into clamp block 38 for engaging and holding feeler 40 in its proper position. It will be noted that feeler 40 can be moved to a retracted position by loosening screw 42, retracting the feeler and retightening screw 42. Alternatively, feeler 40 can be removed from the device completely.

A flexible sheated push-pull control cable 44 (FIGURE 1), mounted to the frame of bicycle 12 by a suitable clip 46, extends from a gripper member 48, mounted by sprocket 50 at the bicycle handle, to the distal end of pivot arm 24 where cable 44 is secured at 52. Movement of the gripper member 48 downward toward the bicycle handle grip pulls the cable to move pivot arm counterclockwise (as seen in FIGURE 1) about pin 26 and move momentum wheel 14 into tight engagement with the bicycle tire. For returning the momentum wheel away from the bicycle tire upon release of gripper member 48, a pair of strong tension springs 54 are provided biasing between pivot arms 24 and support arms 32 to pivot the arm 24 clockwise without pin 26.

A plastic cover 56 having a shape simulating that of a motor, is removably secured by suitable mounting bolts 58 to legs 28 and arms 32 to cover the momentum wheel 14 and most of the attentive operating system for the purpose of providing a pleasing appearance for the device. An opening 60 in cover 56 is provided to accommodate the operation of pivot arms 24 as well as the extension of support arms 32.

I claim:
1. A propelling device for attaching to a bicycle comprising a momentum wheel, mounting means for supporting said momentum wheel for rotation on a bicycle frame including means mounting said momentum wheel for movement between a position engaging the bicycle tire and a position retracted from the bicycle tire, and selectively operable means for moving said momentum wheel between said engaging and retracted positions.

2. A combination comprising a bicycle and the device for claim 1 wherein said moving means extends to the bicycle handle and includes a manually operable device adapted for mounting on the bicycle handle for actuating the moving means.

3. The device of claim 1 wherein said moving means comprises means extending to a position remote from said mounting means.

4. The device of claim 3 wherein moving means comprises a cable extending to a manually operable gripper for moving the cable lengthwise in a direction moving said wheel to engaging position.

5. The device of claim 4 including tension spring means for returning said momentum wheel to retracted position responsive to release of said gripper means.

6. The device of claim 1 including motor noise simulating means mounted for operation responsive to (1) movement of said momentum wheel to engaging position and (2) rotation of said momentum wheel.

7. The device of claim 6 wherein said motor noise simulating means comprises a ratchet wheel mounted for rotation with said momentum wheel and a feeler means secured against rotation relative to said ratchet wheel and for engaging said ratchet wheel.

8. The device of claim 7 including means mounting said feeler for movement between a position engaging said ratchet wheel and a position retracted from said ratchet wheel.

9. The device of claim 1 including cover means releasably mounted to said mounting means for covering said momentum wheel and having the shape of a motor portion.

10. The device of claim 1 wherein the tread of said momentum wheel is concave for receiving the bicycle tire.

References Cited
UNITED STATES PATENTS

| | | | |
|---|---|---|---|
| 421,068 | 2/1890 | Surfleet | 280—217 |
| 2,141,233 | 12/1938 | Alexander | 280—217 |
| 2,578,682 | 12/1951 | Fernstrom | 280—1.14 |
| 2,965,393 | 12/1960 | Cauchon | 280—212 |
| 3,056,460 | 10/1962 | Hanson | 180—74 X |

LEO FRIAGLIA, *Primary Examiner.*

U.S. Cl. X.R.

116—56; 280—1.14, 217; 180—74